Mar. 6, 1923.                T. J. GESSMAN                1,447,543
                             SAWING MACHINE
                           Filed June 6, 1921           2 sheets-sheet 2
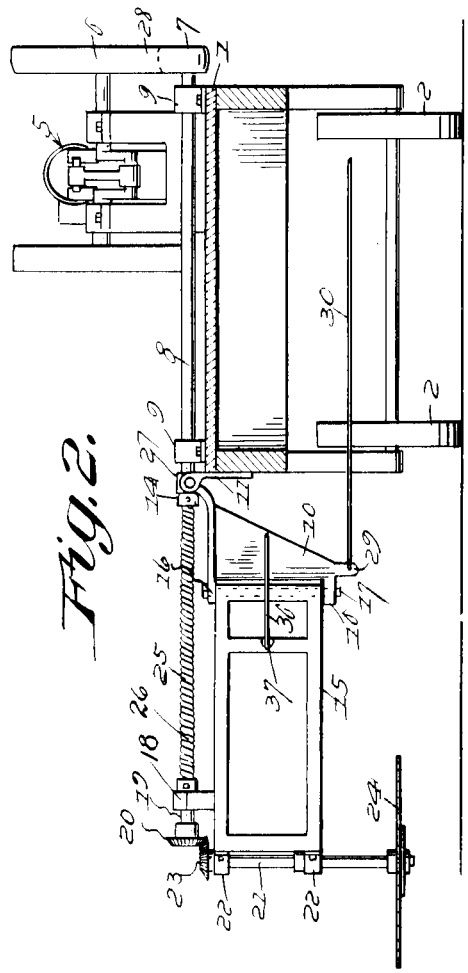
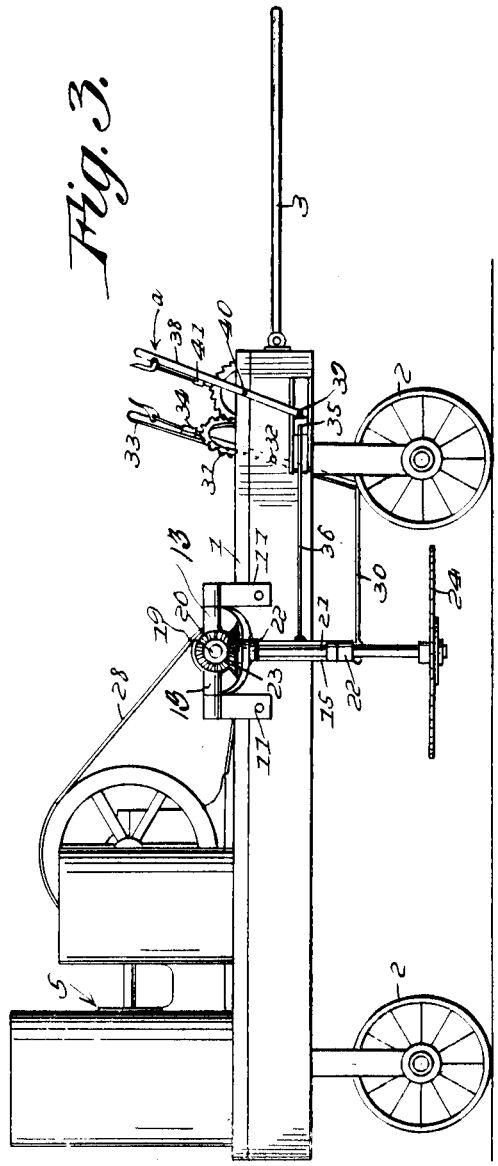
Inventor
T. J. Gessman,
By Watson E. Coleman
Attorney Patented Mar. 6, 1923.

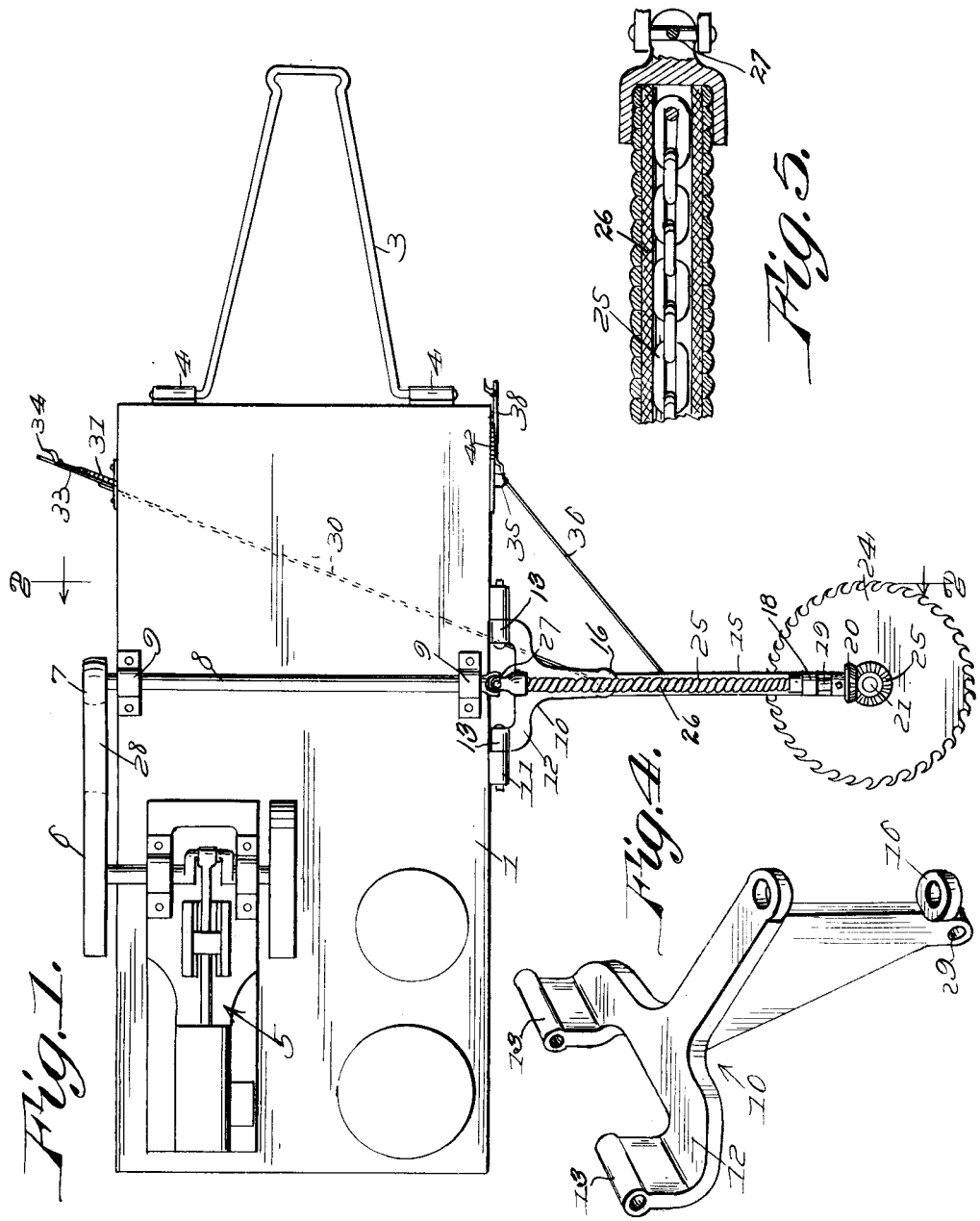

1,447,543

UNITED STATES PATENT OFFICE.

THEODORE J. GESSMAN, OF EOLIA, MISSOURI.

SAWING MACHINE.

Application filed June 6, 1921. Serial No. 475,497.

*To all whom it may concern:*

Be it known that I, THEODORE J. GESSMAN, a citizen of the United States, residing at Eolia, in the county of Pike and State of Missouri, have invented certain new and useful Improvements in Sawing Machines, of which the following is a specification, reference being had to the accompanying drawings.

In clearing timber land with an ax, the stumps are left standing, making it difficult to plow the land, when it is to be used for agricultural purposes. Therefore the purpose of the present invention is to provide a machine of this character, wherein means are afforded for moving a circular saw vertically or laterally, whereby the blade may be operated very close to the ground, so that when felling the trees they may be cut close to the surface of the ground, making it easier to plow the ground and remove the stumps and roots.

Another purpose embodies the provision of a machine which is portable, and which is simple, efficient and practical in construction, and is capable of saving considerable labor in clearing timber lands.

Still another purpose consists in the provision of a machine of this general character, wherein a frame is mounted upon a portable truck for universal movement, and provided with a circular saw disposed in a horizontal plane, and having universal operative connections with a driven member on the truck, so that the saw may be adjusted to different positions, for cutting a tree.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved sawing machine constructed in accordance with the invention.

Figure 2 is a transverse sectional view on line 2—2 of Figure 1.

Figure 3 is a view in side elevation of the machine, showing the frame carrying the saw in end elevation.

Figure 4 is a detail view of the bracket 10.

Figure 5 is a detail sectional view through the flexible shaft, where it is universally united to the shaft 8.

Referring to the drawings, 1 designates a platform or frame, which is mounted upon suitable supporting wheels 2, so that the frame or platform may be moved from one place to another. A suitable handle 3 is connected at 4 to one end of the platform or frame, whereby the machine may be moved from one place to another manually. Obviously the handle 3 may be eliminated, and in lieu thereof a suitable draft equalizer may be connected, whereby the machine may be moved from one place to another by draft animals. When constructing the machine to be moved from one place to another by draft animals, it is the aim to construct the machine relatively large, so that the saw may be used for cutting relatively large trees.

Mounted upon the platform or frame is a suitable motor 5, such as a gasoline engine or the like, and carried by the driving shaft thereof is a suitable pulley 6, which is belted to the pulley 7 mounted upon the shaft 8. The shaft 8 is mounted in bearings 9 which are carried by the frame or platform 1.

A bracket 10 is hingedly mounted on the supporting arms 11 of the frame or platform 1. In fact the bracket 10 has forks 12, the terminals of which have sleeves 13, which receive the pins 14 which extend through the sleeves of the arms 11. In this way the bracket 10 is capable of vertical swinging movement, with respect to the frame or platform.

An auxiliary frame 15 is mounted upon the bracket 10 for swinging movement laterally to the vertical movement of the bracket 10. In order to accomplish this, the bracket 10 has ears 16, through which and through one end of the auxiliary frame 15, elongated bolts 17 extend, thereby pivotally connecting the auxiliary frame 15 and the bracket 10.

Mounted in a bearing 18 of the auxiliary frame 15 is a shaft 19 provided with a bevel gear 20 at one end. A shaft 21 is mounted in bearings 22 of one end of the auxiliary frame 15, and the upper end of the shaft carries a bevel gear 23, which meshes with the bevel gear 20. The lower end of the shaft 21 has a circular saw 24, which operates in a horizontal plane, and is adapted for cutting trees. It is obvious that the saw is capable of being positioned very close to the ground, so that the stumps may be cut substantially flush with the surface of the ground.

A flexible shaft 25 is connected to one end of the shaft 19, and is provided with a suitable pliable covering 26. The flexible shaft 25 is in turn connected to the shaft 8 as at 27. This connection 27 with the shaft 8 is aligned with the pivot connections between the bracket 10 and the arms 11, so as to permit of universal movements between the flexible shaft and the shaft 8. Obviously since the pulley 6 is belted to the pulley 7 by means of the belt 28, power is transmitted to the flexible shaft, and thence to the circular saw, through the medium of the shaft 19 and the bevel gears 20 and 23.

The lower part of the bracket 10 has a projecting arm 29, to which a rod 30 is connected. A segment 31 is mounted upon the frame or platform 1, on the side opposite to where the auxiliary frame is connected. Pivotally connected to the segment as at 32 is a lever 33 provided with a hand grip operated dog 34 to engage the teeth of the segment for holding the lever in different adjusted positions. The lower end of the lever 33 is connected to the rod 30, therefore when the lever 33 is oscillated in one direction or the other, the bracket 10 may be moved vertically, so as to position the circular saw, as may be found convenient for cutting trees.

A slide 35 is mounted in guides of one side of the frame or platform, and connected to one end of the slide is a rod or bar 36, which is pivotally connected as at 37 to the oscillatory auxiliary frame 15. The other end of the slide 35 is operatively connected to a lever 38 by means of a link 39. The lever 38 is pivotally mounted at 40, and is provided with a hand grip operated dog 41 for engagement with the teeth of a segment 42, to hold the lever 38 in different positions. Obviously the lever 38 may be moved backward and forward, for the purpose of adjusting the auxiliary frame 15 laterally with respect to the movement of the bracket 10. In fact the operator may keep the hand operated dog of the lever 38 at all times out of engagement with the teeth of the segment, thereby maintaining the auxiliary frame 15 continually under manual control, so as to maintain the saw continuously under pressure during its operations. If necessary the dog may be maintained in engagement with the teeth of the segment, for the reason that the teeth are ratchet teeth, and under this arrangement pressure need only be applied to the lever 38 in the direction of the arrow a, to maintain the saw close to its work.

When felling trees, it is the aim to move the machine from one place to another. The auxiliary frame is then moved, whereby the saw may assume a position adjacent the tree to form a cut. By moving the lever 33 it is possible to swing the bracket 10 and the auxiliary frame 15 in a vertical plane, for the purpose of positioning the saw at different heights. After placing the saw at the desired height adjacent the tree power may then be transmitted to the saw from the motor to the shaft 8, which will impart movement to the flexible shaft 25 which in turn will transmit movement to the shaft 21 through the medium of the bevel gears 20 and 23. By operating the lever 38 at intervals the auxiliary frame 15 may be swung in a lateral direction, thereby feeding the saw through the work. In other words the saw is fed through the work by lateral swinging through the lever 38. After the saw feeds entirely through the tree, and the tree is felled, the lever 38 may be moved in the reverse direction, to remove the saw from over the face of the trunk.

The invention having been set forth, what is claimed as being useful is:

1. In a sawing apparatus, a main frame, a driven member mounted thereon transversely thereof, a bracket pivotally mounted upon the side of the frame to swing in a vertical plane, an auxiliary frame pivotally connected to the outer end of said bracket to swing in a horizontal plane, a shaft mounted in bearings on the outer end of the auxiliary frame parallel with the end of said auxiliary frame, a cutting element mounted on the lower end of the last named shaft, a shaft mounted in bearings on the top of the auxiliary frame and operatively connected with the shaft carrying the cutting element, a flexible shaft connected to the shaft on top of the auxiliary frame, a universal joint connecting the flexible shaft and the driven member, said universal joint being aligned axially with the pivot of the bracket, whereby as the bracket is moved in vertical and horizontal planes, the flexible shaft may correspondingly move, means for shifting the bracket in a vertical plane, and means for shifting the auxiliary frame in a horizontal plane.

2. In a sawing apparatus, a main frame, a bracket, a pair of spaced axially aligned pivots connecting the bracket to the main frame, whereby the bracket may swing in a vertical plane, an auxiliary frame pivotally connected to the bracket, whereby it may swing in a horizontal plane, a vertical shaft mounted in bearings on the end of the auxiliary frame and parallel thereto, a cutting member upon the lower end of the vertical shaft, a flexible shaft parallel with the top of the bracket and the auxiliary frame and having one end operatively connected to the vertical shaft, its other end terminating between the axially aligned pivots of the bracket, driven means on the main frame operatively connecting with the terminal of said flexible shaft at a point between said axially aligned pivots, whereby as the bracket moves in a vertical plane and the auxiliary frame in a lateral direction, the flexible shaft may correspondingly move, means for shifting the bracket in a vertical plane, and means for shifting the auxiliary frame in a lateral direction.

In testimony whereof I hereunto affix my signature.

THEODORE J. GESSMAN.